Patented Aug. 15, 1939

2,169,513

UNITED STATES PATENT OFFICE 2,169,513

PROCESS FOR HARDENING ALBUMINOUS SUBSTANCES

Johannes Brunken, Dessau, Anhalt, Germany, assignor, by mesne assignments, to Agfa Ansco Corporation, Binghamton, N. Y., a corporation of Delaware No Drawing. Application July 16, 1937, Serial No. 154,042. In Germany July 28, 1936

8 Claims. (Cl. 95—7)

My present invention relates to a process for hardening albuminous substances and more particularly to the hardening of photographic gelatin layers by means of halogen-ketones.

In photographic practice there have been used for the hardening of layers containing gelatin, salts of polyvalent metals, particularly aluminium or chromium salts, and aldehydes. Among the aldehydes there have been used or proposed for use formaldehyde, glyoxal, acrolein, dibromacrolein, hydroxyaldehydes and hydroxyaldehydeketones. As compared with aldehydes ketones have only very indifferent properties in respect of hardening gelatin layers. It has been proposed therefore, to use diketones for hardening photographic emulsion layers, but even these are of little effect as compared with the aldehydes. For instance, when diacetyl is used there is required for producing an equal amount of hardening 16 times the molecular proportion of diacetyl for one of glyoxal.

It is an object of my invention to provide a process by which albuminous substances may be hardened by means of halogen-ketones not containing an aldehyde group.

A further object is to provide a novel hardening agent for gelatin emulsions for photographic purposes. Further objects will be apparent from the detailed specification following hereafter.

This invention is based on the observation that a ketone not containing an aldehyde group which has no sufficient hardening action may be converted into a very active hardening agent by introducing into its molecule one or more halogen atoms. For example dichloro-acetone is a very effective hardening agent.

In principle all halogen ketones whether aliphatic or aromatic have been found to yield good results. It is possible to vary the strength of the hardening agent by selecting differently substituted halogen ketones.

As a general rule it may be said that the hardening effect of a halogen ketone decreases with the increase in the number of carbon atoms in the molecule of the ketone. On the other hand the effect is increased if a ketone containing in its molecule a plurality of halogen atoms is used.

For example, if the ketone contains only one halogen atom the hardening effect is somewhat smaller than when there are two such groups. Dichloro-acetone, therefore hardens more strongly than monochloro-acetone does.

As examples especially suitable for the purpose of the present invention there may be named the following compounds: Dichloroacetone, monochloroacetone, dibromoacetone and similar compounds.

The new hardening agents are applied in photography in the usual manner. Advantageously the new hardening agent may be added to the gelatin solution or to the emulsion shortly before casting or the finished cast layer or even the finished developed layer which may be carried on any desired support, for instance glass, paper, cellulose or a cellulose derivative or metal, may be bathed in the solution of the ketone in question. The proportion of the substituted ketone to be used depends upon the desired melting point of the finished product and amounts in general to 0.05–5 grams of the hardening substance per kilo of gelatin solution of 10 per cent strength. However, this range of proportion does not represent the limit of the possibility in using the hardening agent. It may be added that the application of these new hardening agents is not limited to photographic emulsions or photographic layers, but extends quite generally to gelatin and other albuminous substances, which requires hardening, for instance albumin, casein, gliadin, whatever the purpose may be; it is immaterial whether the albuminous substance to be hardened has the form of a layer on a support, or is used without a support.

The following example serves to illustrate the invention without limiting it to the specific halogen ketone mentioned therein.

To one kilo of photographic silver halide emulsion ready for casting there is added 1 gram of dichloroacetone. The rise in the melting point is not noticeable immediately after drying, but after the usual storage of about 20 weeks the melting point has risen to 36°.

What I claim is:

1. A process which comprises melting gelatin jelly, mixing said gelatin with an aqueous solution of chloro-acetone and casting said gelatin to form a layer.

2. A process which comprises adding to an aqueous silver halide emulsion containing 8 to 9 per cent gelatin from about 0.05 to 5 per cent of chloroacetone.

3. A process of hardening an albuminous substance which consists in treating it with a ketone containing in its molecule at least one halogen atom and no aldehyde group.

4. A process of hardening gelatin which consists in treating it with a ketone containing in its molecule at least one halogen atom and no aldehyde group.

5. A process of hardening gelatin which consists in treating it with chloro-acetone.

6. A process of hardening gelatin which consists in treating it with dichloro-acetone.

7. A process of hardening gelatin which consists in treating it with dibromo-acetone.

8. A photographic material provided with a gelatin silver halide emulsion layer, said layer containing the condensation product of gelatin and a ketone containing in its molecule at least one halogen atom and no aldehyde group.

JOHANNES BRUNKEN.